United States Patent [19]
Narbaits-Jaureguy et al.

[11] 3,922,636
[45] Nov. 25, 1975

[54] SURVEILLANCE SYSTEM FOR MONITORING TRAFFIC IN LOCALIZED AREAS OF A ROUTE

[75] Inventors: Jean-Raymond Narbaits-Jaureguy; Henri Billottet, both of Paris, France

[73] Assignee: Thomson-CSF, Paris, France

[22] Filed: July 2, 1973

[21] Appl. No.: 375,470

[30] Foreign Application Priority Data
July 7, 1972  France .................. 72.24749

[52] U.S. Cl. ............ 340/24; 340/152 T; 343/6.5 R; 343/6.5 LC
[51] Int. Cl.² ................ G01S 9/02; G08G 1/12
[58] Field of Search ..... 343/6 A, 6 R, 6.5 SS, 6.5 R, 343/112 TC, 5 PD, 6.5 LC; 340/152 T, 312, 24

[56] References Cited
UNITED STATES PATENTS

| | | | |
|---|---|---|---|
| 2,972,141 | 2/1961 | Barlow et al. | 343/5 PD |
| 3,160,881 | 12/1964 | Pederzani et al. | 343/6 A |
| 3,560,971 | 2/1971 | Alsberg et al. | 343/6 R |
| 3,568,161 | 2/1971 | Knickel | 340/172.5 |
| 3,691,558 | 9/1972 | Hoard et al. | 343/5 PD |
| 3,696,384 | 10/1972 | Lester | 340/152 T |
| 3,714,649 | 1/1973 | Brouwer | 343/6.5 R |
| 3,733,602 | 5/1973 | Cuckler et al. | 343/5 PD |
| 3,757,035 | 9/1973 | Sullivan | 340/152 T |

*Primary Examiner*—Maynard R. Wilbur
*Assistant Examiner*—G. E. Montone
*Attorney, Agent, or Firm*—Karl F. Ross; Herbert Dubno

[57] ABSTRACT

A system for the surveillance in localized areas of objects moving along a route is described which includes detectors distributed along the route to be kept under surveillance; each of these detectors is connected by a multi-core cable to a control post which individually interrogates the detectors and processes the information supplied by them.

5 Claims, 4 Drawing Figures

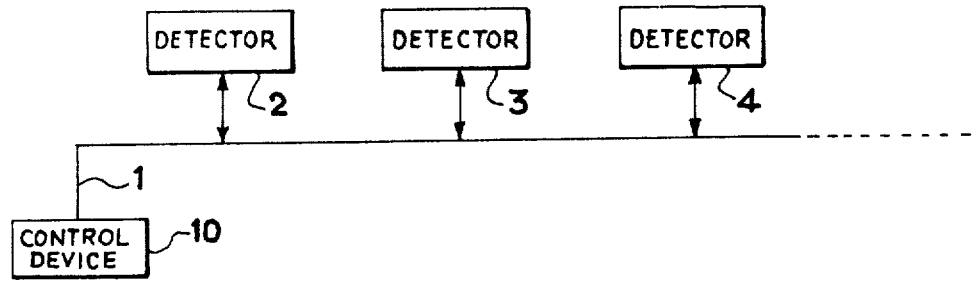
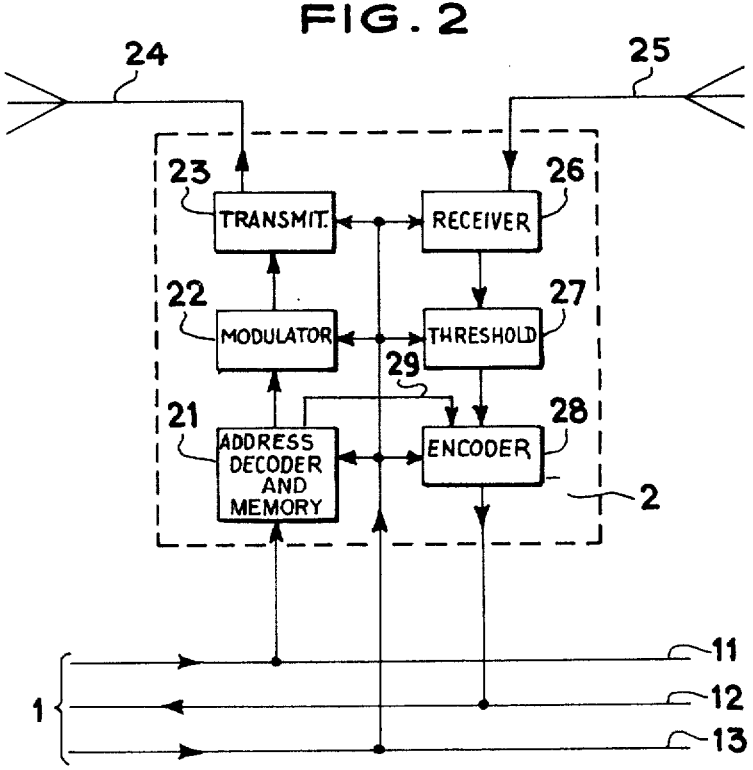

SURVEILLANCE SYSTEM FOR MONITORING TRAFFIC IN LOCALIZED AREAS OF A ROUTE

FIELD OF THE INVENTION

The present invention relates to the surveillance of the movement of objects along a route.

BACKGROUND OF THE INVENTION

Various systems are known which supply information on the number of objects moving along the route in question, and on their position and possibly their speed. Systems using radar, for example, can keep a route section of limited length under surviellance, when it is necessary to keep a lengthy route section under surveillance, such radars may utilize radiating elements laid down along the route, as disclosed in our copending application Ser. No. 375,444 of even date.

Such systems are theoretically applicable to the surveillance of a very considerable length of route but, in practice, would involve excessive manufacturing costs due to the amount of and equipment required the resultant complexity of the overall system.

OBJECT OF THE INVENTION

The object of our present invention is to provide a system for the surveillance of objects moving along a route which avoids the above disadvantages.

SUMMARY OF THE INVENTION

In accordance with this invention we provide a plurality of detectors fixedly disposed along a route whose traffic is to be surveyed, each detector having an operating range limited to a predetermined route section respectively assigned to it. The detectors are linked with one another by a communication channel to which a control post is also connected, this post being provided with signal-generating means operable to emit over that channel an address code identifying a selected detector. Each detector includes monitoring means activatable by an address decoder, upon reception of the corresponding address code, to produce a characteristic signal revealing the presence of a vehicle in the assigned route section, the term "vehicle" being intended to embrace all kinds of moving objects. Each detector further comprises answerback means connected to the associated monitoring means for transmitting the characteristic signal, preferably along with the address code of the detector, to the control post, where the signal is registerd by a suitable indicator. The latter may be a display device translating this signal and the accmpanying address code into markings indicative of the presence of a vehicle in any of the route sections assigned to the several detectors, these markings being visually correlated with respective detectors by, for example, representation in a coordinate system.

BRIEF DESCRIPTION OF THE DRAWING

The invention will be better understood from the following description given with reference to the accompanying drawing in which:

FIG. 1 is a block diagram of the overall system according to the invention;

FIG. 2 is an embodiment of a detector used in the system according to the invention;

DESCRIPTION OF A PREFERRED EMBODIMENT

Figure 3:
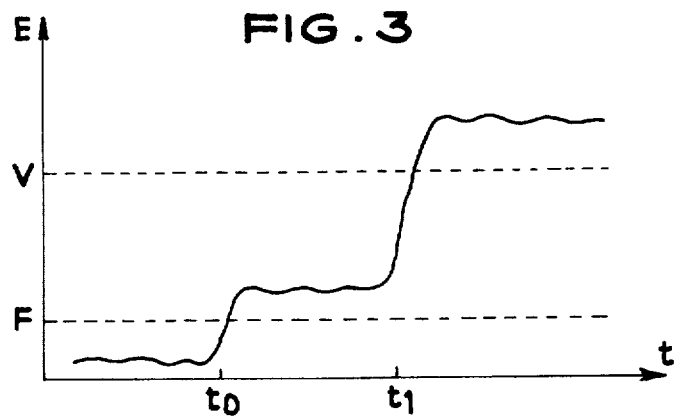
FIG. 3 is an explanatory graph.

In the overall diagram in FIG. 1 we have shown three detectors 2, 3 and 4 for sensing the presence of moving objects, which are positioned along a route to be kept under surveillance; they are connected by a multi-core cable 1 to a control device or post 10 which has the triple function (achieved in the way described below) of:

interrogating any one of the detectors, making use of the response received from the detector interrogated, and supplying power to the detectors.

The detectors 2–4 may comprise any known monitoring means such as, for example, optical, magnetic or electro-acoustic devices which supply a response indicating the presence or absence of moving objects when interrogated. One embodiment thereof is shown in FIG. 2 as a non-limiting example, incorporating a transmitter 23 and a receiver 26 of electromagnetic waves.

The detector 2 shown in FIG. 2 comprises an address decoder 21 connected to a modulator 22, which in turn is connected to the transmitter 23. The receiver 26 is connected to a threshold device 27 coupled to an encoder 28 serving as an answer-back means. The multicore cable 1 is made up of three conductors 11, 12 and 13, the first conductor 11 being connected to the address decoder 21 whereas the second conductor 12 leads the encoder 28; the third conductor 13 supplies power to each of the components 21, 22, 23, 26, 27 and 28 of the detector.

In operation, interrogation of the detector 2 by the control post 10 takes the form of transmission along conductor 11 of the address of the detector 2, which may be in binary code for example. This address is received by device 21, here termed the address decoder, of conventional construction which may include a passive memory containing the address assigned to this particular detector, a shift register which receives the address transmitted along conductor 11, and a logic circuit which compares the content of the passive memory with those of the shift register. When the contents are identical, a trigger signal is transmitted to modulator 22 which activates transmitter 23 for a predetermined time, of the order of a few microseconds.

Transmitter 23 is of very low power and transmits energy via an antenna 24; receiver 26 receives energy via an antenna 25. The detector 2 and its two antennas 24 and 25 are laid down on the surface of the route under surveillance, either recessed or projecting slightly.

The antennas 24 and 25 have slight mutual coupling so that there is a certain energy level present in receiver 26 even when there is no moving object above the detector. FIG. 3 is a graph, with energy E plotted along the Y axis and time $t$ plotted along the X axis, which shows the various amounts of energy which may be received by receiver 26:

Between time $t = 0$ and time $t = t_o$, the energy level is very low, lower than an operating threshold referred to as F: this section corresponds to the transmitter being inoperative, either because it is not being interrogated or because it has broken down; the energy rceived is then due only to interference phenomena.

From time $t = t_0$ to time $t = t_1$ the energy level is between two predetermined thresholds E = F and E = V;

this energy level corresponds to the coupling between the antennas 24 and 25 when there are no moving objects and when the transmitter is operative and in a state of readiness.

From time $t = t_1$ onwards, the energy level is above threshold V, which is a result of the increase in the coefficient of coupling between antennas 24 and 25 due to the presence of a moving object above them. Such an increase in coupling factor is also described in our copending application Ser. No. 375,446 of even date.

The function of the threshold device 27 is to supply the encoder 28 with a response signal which indicates which state the detector is in among the three possible states defined above, namely the inoperative state, the operative state of readiness with no moving object present, or the active state with a moving object present. The slight coupling between the antennas 24 and 25 thus has the advantage of enabling the detector 2 to indicate a possible breakdown by not giving a response signal when interrogated. It has the further advantage, which has been demonstrated experimentally, of increasing the detection sensitivity of the apparatus. The encoder 28 has the function of transmitting the response signal, accompanied by the address of the detector, to the control post 10 via conductor 12. The address of the detector may be simply obtained from the contents of the shift register associated with the device 21, as indicated schematically in FIG. 2 by an arrow 29.

The other detectors positioned along the route to be kept under surveillance may be formed in a similar way, except as concerns their decoder 21; the latter should, in fact, be capable of recognizing only a single address, which is different for each of the detectors.

Figure 4:
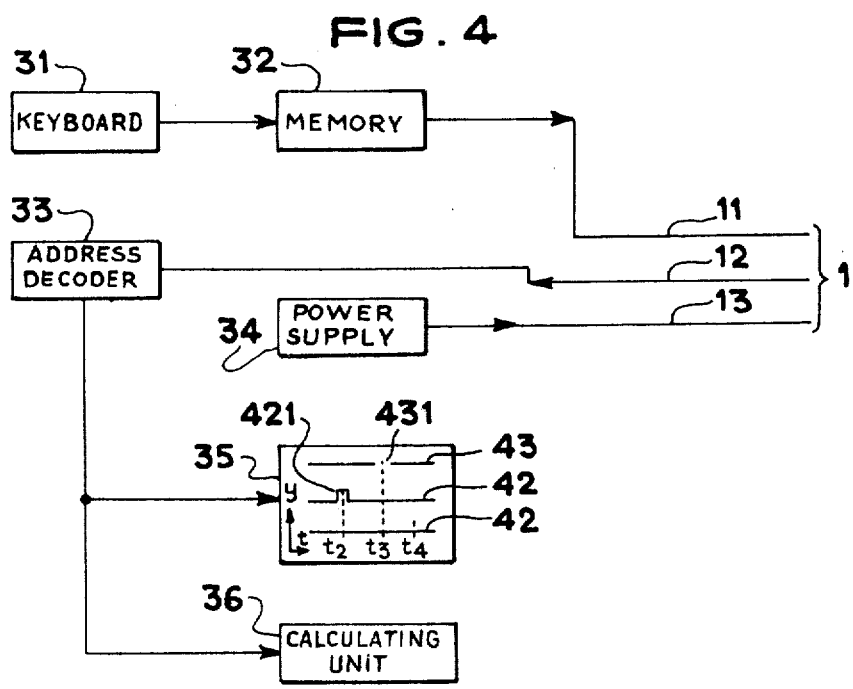
FIG. 4 is a block diagram of one embodiment of a control device for the system according to the invention.

FIG. 4 shows a representative embodiment of the control post 10 in FIG. 1. It comprises a power-supply unit 34 which is connected to conductor 13 in cable 1, an assembly for processing the information arriving from the detectors, which is connected to conductor 12, and a memory 32 containing the addresses of all the detectors and supplying along conductor 11 that address which has been selected by a device 31 connected to memory 32. Device 31 my be formed by a keyboard control enabling any one of the detectors to be interrogated or by a timer which interrogates the detectors sequentially in a specific order.

The processing assembly connected to conductor 12 receives from the detectors information made up of an address and positional data. It therefore incorporates an address decoder 33 which establishes the geographic point from which the positional information in question is coming, a display device 35 and, possibly, a calculating unit 36.

An example of the way in which the results are presented on the display device 35 is shown in FIG. 4. Time $(t)$ is plotted along the x axis and the addresses of the three detectors 2, 3 and 4 in FIG. 1 appear along the y axis of a coordinate system, i.e., the three detectors 2, 3 and 4 are respectively identified by three lines 42, 43 and 44. At the time marked $t_2$, interrogation of detector 3 shows by a characteristic signal (peak 421) that there is a moving object in its area of detection; at time $t_3$, interrogation of detector 4 indicates by a gap 431 in line 44 that it has broken down, and interrogation of the detector 42 at time $t_4$ shows that this detector is in a state of readiness but there is no vehicle in its area of detection.

As demonstrated by the above example, the order of interrogation is completely independent of the order in which the detectors are positioned along the route. This contrasts with the system of our copending application Ser. No. 375,446 in which a series of such detectors are activated in sequence.

The surveillance system here disclosed thus enables the presence of moving objects to be detected, by interrogation, in small, predetermined monitoring areas distributed along a route which may be of considerable length. It may further, as in the embodiment described above, enable continuous checking of the satisfactory operation of each detector.

This system may be applied to the surveillance of traffic in any sphere in which routes may be exactly defined, including sea routes and waterways for maritime or river traffic; the detectors for sensing the presence of moving objects must then of course be adapted to the field in question.

What is claimed is:

1. A system for surveying traffic along a route, comprising:
   a plurality of detectors fixedly disposed along said route, each of said detectors having an operating range limited to a predetermined route section respectively assigned thereto;
   a communication channel linking all said detectors;
   a control post connected to said channel;
   signal-generating means at said control post operable to emit over said channel an address code identifying a selected detector;
   address-decoding means at each detector connected to said channel for recognizing the corresponding address code;
   answer-back means at each detector connected to said channel for transmitting a characteristic signal to said control post in an operative condition of the detector;
   monitoring means at each detector including a transmitter connected to said address-decoding means and provided with a first antenna for sending out electromagnetic wave energy in reponse to said corresponding address code, a receiver provided with a second antenna loosely coupled to said first antenna for feeding back wave energy to said answer-back means in said operative condition, and threshold means between said receiver and said answer-back means for discriminating between a relatively high energy level indicative of the proximity of a vehicle and a relatively low level indicative of the absence of vehicles from the assigned route section; and
   indicator means connected to said channel at said control post for distinguishing between the absence of a characteristic signal, a low-level characteristic signal and a high-level characteristic signal from any detector addressed by said signal-generating means.

2. A system as defined in claim 1 wherein each detector includes an address memory forming part of said address-decoding means, said answer-back means being connected to said address memory for transmitting the address code of the respective detector to said control post along with said characteristic signal.

3. A system as defined in claim 2 wherein said indicator means comprises a display device translating said characteristic signal and the accompanying address code into markings indicative of the presence of a vehicle in any of said route sections, said markings being visually correlated with respective detectors.

4. A system as defined in claim 1 wherein said channel comprises a cable with a first conductor for address codes emitted by said control post and a second conductor for characteristic signals originating at said detectors.

5. A system as defined in claim 4 wherein said control post is provided with power-supply means, said cable including a third conductor connected to said power-supply means for energizing the equipment of said detectors.

* * * * *